United States Patent [19]
Papendick

[11] Patent Number: 5,772,233
[45] Date of Patent: Jun. 30, 1998

[54] EXPANDABLE PAINTING WAGON

[75] Inventor: Gerd R. Papendick, Bradford, Canada

[73] Assignee: Decoma International Inc., Canada

[21] Appl. No.: 629,434

[22] Filed: Apr. 9, 1996

[51] Int. Cl.$^6$ .................................................. B23Q 3/08
[52] U.S. Cl. .......................... 280/638; 280/35; 280/651; 280/79.3; 269/43; 269/17
[58] Field of Search .............................. 280/638, 35, 651, 280/639, 47.34, 79.11, 79.2, 79.3; 269/17, 43, 69; 108/145, 12, 69, 83

[56] References Cited

U.S. PATENT DOCUMENTS

| | | | |
|---|---|---|---|
| 35,671 | 6/1862 | Corbett | 108/145 |
| 318,593 | 5/1885 | Behrens | 108/145 |
| 579,658 | 3/1897 | Totten | 280/640 |
| 862,791 | 8/1907 | Bawden et al. | 108/145 |
| 1,665,833 | 4/1928 | Zork | 108/69 |
| 2,301,636 | 11/1942 | Nicol | 269/69 |
| 2,879,059 | 3/1959 | Sandefur | 269/17 |
| 2,885,090 | 5/1959 | Forman et al. | 211/175 |
| 2,904,308 | 9/1959 | Vergara | 269/17 |
| 3,278,042 | 10/1966 | Frydenberg | 280/35 |
| 3,782,748 | 1/1974 | Poland | 280/79.11 |
| 3,933,218 | 1/1976 | Oler et al. | 180/79.1 |
| 4,033,597 | 7/1977 | Boyer | 280/46 |
| 4,148,264 | 4/1979 | Caravias | 108/145 |
| 4,166,638 | 9/1979 | De Prado | 280/638 |
| 4,192,541 | 3/1980 | Ferneau | 296/20 |
| 4,302,023 | 11/1981 | Kiesz | 280/43.24 |
| 4,325,323 | 4/1982 | Rioux | 118/504 |
| 4,463,937 | 8/1984 | Celette | 269/69 |
| 4,475,760 | 10/1984 | Morgan | 296/26 |
| 5,080,381 | 1/1992 | Perez | 280/35 |
| 5,092,623 | 3/1992 | Swanner | 280/638 |
| 5,118,245 | 6/1992 | Dunkel | 414/537 |
| 5,123,665 | 6/1992 | Levy | 280/35 |
| 5,127,359 | 7/1992 | Kanari et al. | |
| 5,296,030 | 3/1994 | Young | |
| 5,501,736 | 3/1996 | Statz et al. | |
| 5,599,031 | 2/1997 | Hodges | 280/79.11 |

FOREIGN PATENT DOCUMENTS

| | | | |
|---|---|---|---|
| 886388 | 10/1943 | France | 280/640 |
| 650 421 A5 | 2/1981 | Switzerland . | |

OTHER PUBLICATIONS

Fautless Caster Corporation, Fautless Facts, "New–Caster", vol. 1955, No. 9, Sep. 1955.

Primary Examiner—Brian L. Johnson
Assistant Examiner—Bridget Avery
Attorney, Agent, or Firm—Cushman, Darby & Cushman, IP Group of Pillsbury, Madison & Sutro LLP

[57] ABSTRACT

A painting wagon carries a plurality of components to be painted through a painting facility. The wagon includes a component supporting assembly having a plurality of opposed pairs of component mounting pins fixed thereto. The component supporting assembly is supported by a base structure having wheels which permit the painting wagon to be translated. The component supporting assembly may be selectively adjusted between a contracted configuration in which each of the pairs of opposed mounting pins, and thus the components mounted thereon, are oriented in contracted proximity to one another, so as to minimize the overall size of the wagon with the components mounted thereon to accommodate given dimensional limitations of the painting facility and an expanded configuration in which the pairs of opposed mounting pins, and thus the components mounted thereon, are oriented so as to be expanded apart from one another so that individual components may be mounted and dismounted onto the component mounting pins with reduced danger of bumping an adjacently mounted component and thus damaging the surface finish of the components.

12 Claims, 7 Drawing Sheets

EXPANDABLE PAINTING WAGON

BACKGROUND OF THE INVENTION

1. Field of the Invention

The present invention relates to a painting wagon for carrying a plurality of components to be painted through a painting facility and more specifically to an expandable painting wagon which is adjustable between an expanded configuration for facilitating convenient loading and unloading of the components thereon and a contracted configuration for increasing the number of components that can be carried per unit length of the wagon. The present invention further relates to a method for simultaneously painting a plurality of such components.

2. Background Information

Certain body panels used in motor vehicles are painted separately from the remainder of the motor vehicle to which the panels are to be attached. Such panels are often painted by mounting a plurality of the panels on a wagon, moving the wagon through a painting facility, and applying paint to the panels as they are moved through the facility. The painting facility may include, for example, a multiple stage washer, booths for color coat application, booths for clear coat application, cure ovens, and a cool down section. Individual wagons may be moved through the paint facility by a wagon propelling mechanism, such as an in-ground chain conveyor which pulls the paint wagons along at a predetermined spacing.

The costs of painting a particular component are significantly impacted by the throughput (i.e., the number of components that can be painted per unit time or per wagon). This is largely affected by the number of components that can be mounted per unit length on the wagon.

It should also be noted that the layout and construction of the paint facility places restrictions on the wagon size. More particularly, physical limitations of the cure oven width and height, tunnel radius, spacing between wagons, etc. define limitations for the wagon size. In addition, the track along which the wagon is translated may be oval or rectangular, thus requiring sharp turns which mandate a compactness for the wagon not necessarily required for the straighter portions of the track. These dimensional limitations further impact throughput. It is thus desirable to maximize the number of components which are mounted per unit length on the painting wagon, especially at certain areas within the painting facility that have such dimensional limitations.

Traditionally, one wagon design has been used for all components. The wagon includes a translating base which carries a removable top portion. The top portion includes multiple mounting pin locations, which enable the components to be mounted on the top portion with desired spacing therebetween. The number of components which can be mounted on the wagon is limited by the component size and by the spacing between components. To maximize the number of components per unit length of the wagon, the components are mounted on the wagon as close as possible to one another.

In certain instances, the conventional method of mounting components as close as possible to one another does not take advantage of all available space on the painting wagon. More particularly, in some instances, only a portion of a body panel is to be painted a given color. For example, plastic fascias for certain automobiles are two toned, and therefore, only one-half of the fascia is painted while the other half is masked. In this situation, it would be desirable for the components to be nested such that the portion of each component to be painted overlaps the portion of the adjacent component that is not to be painted or masked to thereby maximize the number of components per unit length of the wagon. Nesting of components in such fashion, however, poses problems in that with the components mounted so closely to one another, it is difficult to load the components onto the cart before painting and unload the components off the cart after painting without bumping the components into one another and thus damaging the surface finish of the components.

In other situations, where it is desirable for the entire component to be painted so that nesting of components during painting is not practical, it may, nevertheless, be desirable for the components to be nested or overlapped on a shorter length wagon while the components are not being painted to enable the wagon to more easily negotiate tight turns during its travel through the painting facility.

From the above, it can be appreciated that there exists a need for a painting wagon that enables the components to be nested on the wagon during certain periods of a painting cycle and to be spaced further apart during other periods of the painting cycle. It is, therefore, an object of the present invention to satisfy this need. To accomplish this object, the present invention provides a painting wagon for carrying a plurality of components to be painted and translating the plurality of components through a painting facility, the painting wagon comprising: a component supporting assembly having a plurality of component mounting structures each constructed and arranged to permit an associated one of the plurality of components to be mounted thereon, so that said components, can be mounted in side by side relation to one another along a given direction, the component supporting assembly being constructed and arranged to be movable between: (1) an expanded configuration in which the component mounting structures are positioned in spaced apart relation with respect to one another along the given direction so that a number of components are mounted per unit length in the given direction; and (2) a contracted configuration in which the component mounting structures are positioned in closer proximity to one another relative to the spaced apart relation so that at least one of the components mounted thereon has a portion thereof disposed in overlying relation with respect to an adjacent one of the components and so that the number of components mounted per unit length in the given direction is greater than when the component supporting assembly is in the expanded configuration; an actuating assembly operatively connected with the component supporting assembly and constructed and arranged to move the component supporting assembly between the contracted configuration and the expanded configuration so that the component supporting assembly is 1) positioned in the expanded configuration to facilitate mounting of the components on the component mounting structures, 2) positioned in the contracted configuration while the painting wagon is translated through at least a portion of the painting facility, and 3) positioned in the expanded configuration to facilitate dismounting of the components from the component mounting structures; and a base structure constructed and arranged to support the component supporting assembly and the actuating assembly and to permit translation of the painting wagon through the paint facility.

It is also an object of the invention to provide a method of painting a portion of each of a plurality of components. The method comprises a method for simultaneously painting a portion of each of a plurality of components comprising: providing a mask to cover a portion of each of the components so as to prevent paint from being applied to the portion; mounting the components in spaced relation to one another on a paint wagon; moving the components into closer proximity to one another relative to the spaced relation so that at least one component has an unmasked portion thereof to be painted disposed in overlying relation with respect to a masked portion of an adjacent one of the components; applying paint to said components so that the unmasked portions thereof are painted; moving the components back to the spaced apart relation to one another; and removing the components from the paint wagon.

Other objects, features and characteristics of the present invention along with the method of operation and assembly will be appreciated from study of the following detailed description and the appended claims and drawings, all of which form part of this application and wherein like reference numerals designate corresponding parts in the various figures.

DETAILED DESCRIPTION OF THE INVENTION

Figure 1:
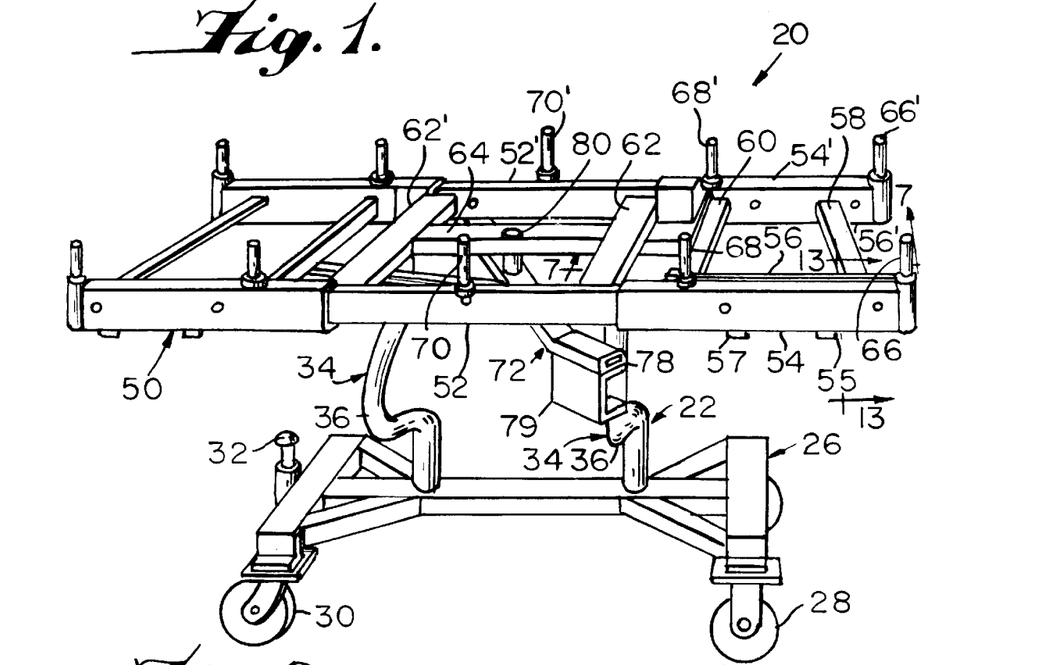
FIG. 1 is a perspective view of an expandable painting wagon according to the present invention.

An expandable painting wagon according to a preferred embodiment of the present invention is shown at 20 in FIG. 1. The painting wagon 20 generally comprises an upper component support assembly 50, for supporting the components to be painted, and a translating base structure 22, for support the component supporting assembly 50 and for permitting the wagon 20 to be translated.

In a typical application of the expandable painting wagon 20 of the present invention, the wagon with a plurality of components to be painted mounted thereon is directed along a predetermined path through a painting system, or facility, which typically includes a series of washers, paint applicators, curing ovens, and a cooling area. In such an application, the wagon 20 is typically directed along the predetermined path by means of a conveyor-like chain (not shown) which engages a vertical retracting puller post 32 (see also FIG. 6). In the broadest application of the present application, however, the painting wagon 20 need not necessarily be used in such an automated painting system as previously described, but may be manually, or otherwise, pushed or pulled to be translated as desired.

Figure 6:
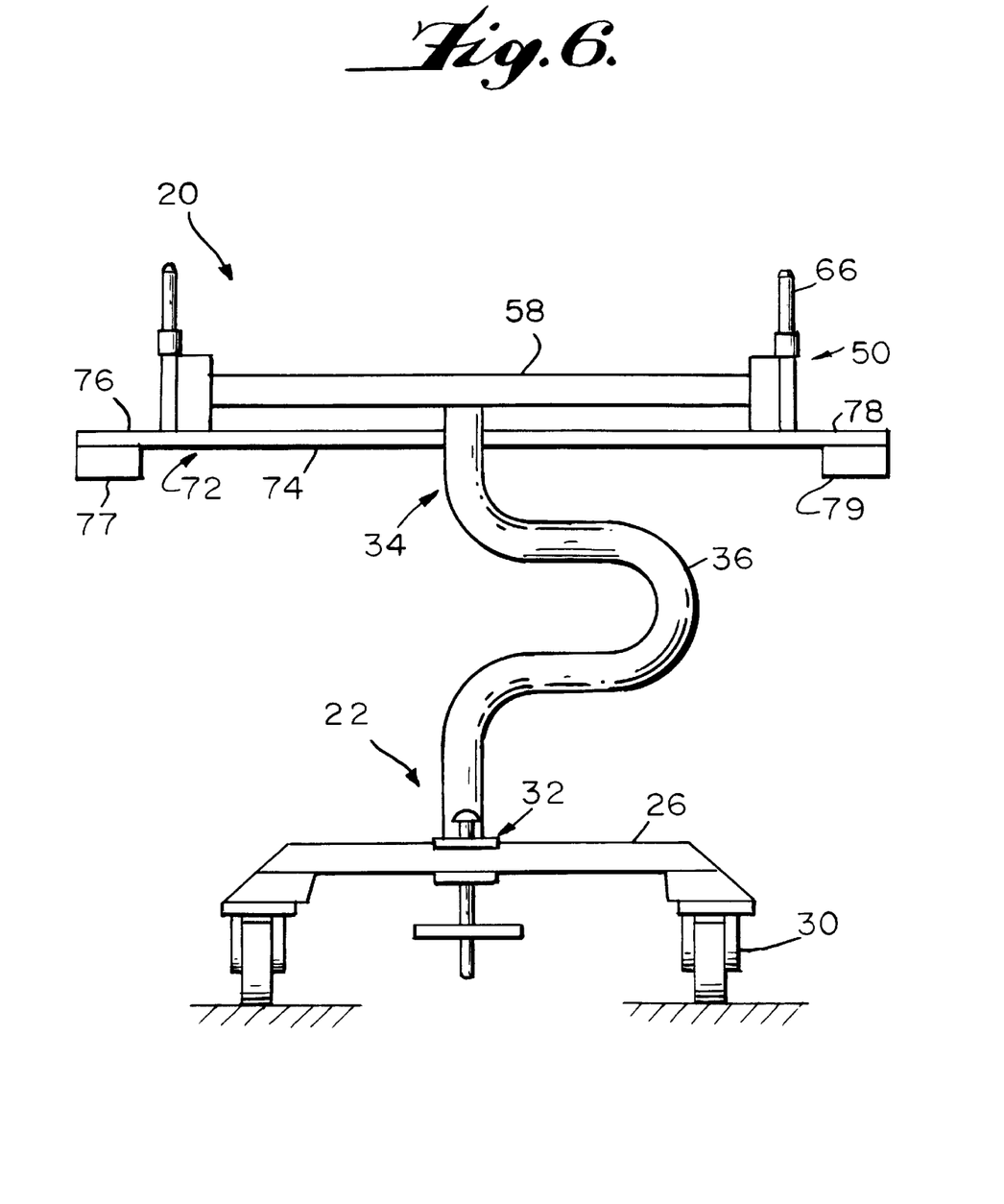
FIG. 6 is an elevation of an end of the painting wagon according to the present invention.

As shown in FIGS. 1 and 6, the translating base structure 22 includes a wheel base structure 26 on which are mounted two forward wheels 30 and two rearward wheels 28. In the presently contemplated application of the painting wagon 20, forward wheels 30 are preferably swivel wheels which may rotate about their respective vertical axes while being pulled along a predetermined path through a painting system. Rearward wheels 28, on the other hand, are preferably fixed about their respective vertical axes and cannot swivel.

The translating base structure 22 further includes forward and rearward vertical post 34, 34' extending upwardly from the wheel base structure 26. Vertical support posts 34, 34' preferably have formed therein an outwardly bent portion 36, 36', respectively. The outwardly bent portions 36, 36' are provided to accommodate a conventional shroud system (not shown) which is preferably provided along the predetermined path in the paint application portions of the automated painting facility. The shrouds are provided to protect the wheels and wheel base structure from paint overspray to prevent excessive paint accumulation on those components.

Figure 3:
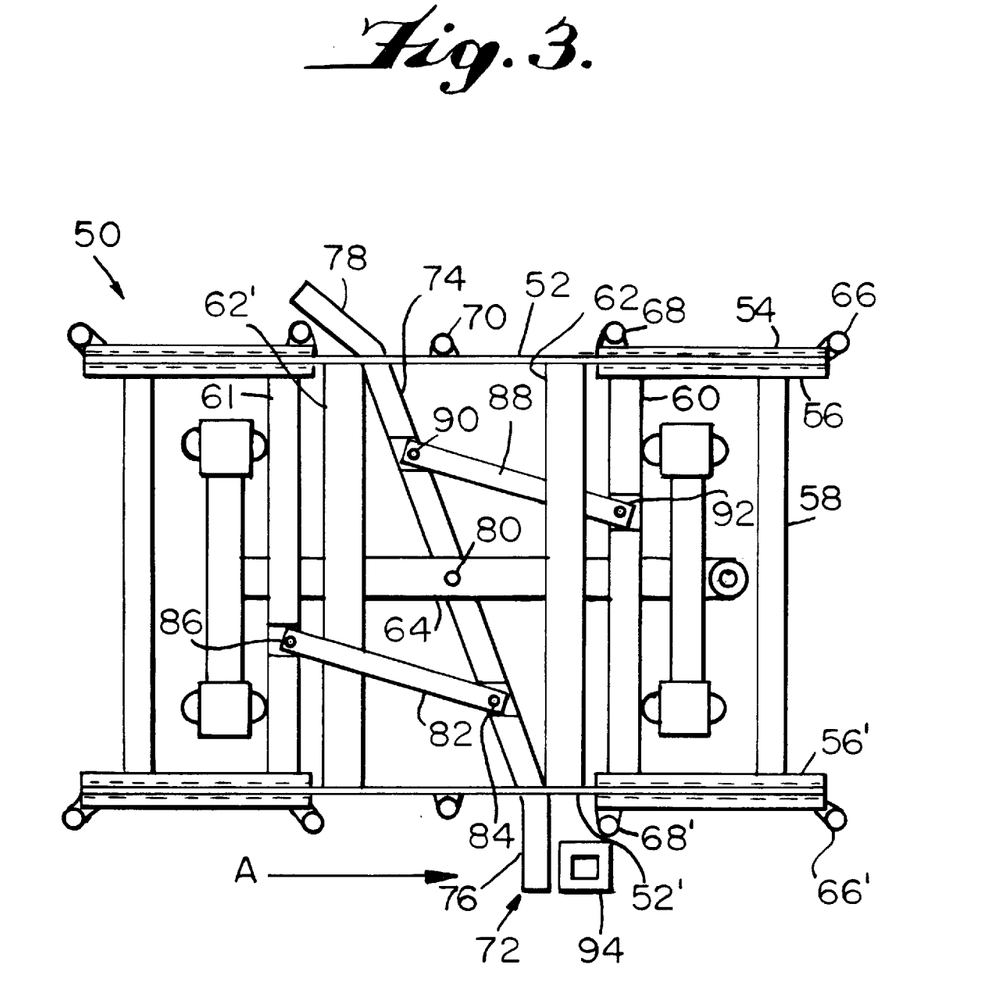
FIG. 3 is a plan view of the expandable painting wagon according to the present invention, shown in a contracted configuration.

The adjustable component support assembly 50 is most clearly illustrated in FIGS. 1 and 3. The adjustable component support assembly 50 is essentially symmetric about its lateral and longitudinal axes. Therefore, for clarity, in most instances only those components on one side of the lateral and longitudinal axes have been numbered and will be described. The component support assembly 50 includes two longitudinal main beams 52, 52'. Longitudinal main beams 52, 52' are fixed in a substantially parallel orientation by two lateral main beams 62 and 62'. A center beam 64 extends between lateral main beams 62 and 62' and is attached at its ends to the lateral main beams 62, 62' at the respective center portions thereof. Vertical posts 34, 34' of the translating base structure 22 are preferably attached to the adjustable component support assembly 50 at the centers of lateral main beams 62', 62, respectively.

An outboard expanding mechanism, the construction and operation of which is described in more detail below, includes outboard sliding channels 54, 54' from which extend component mounting pins 66, 66'. Outboard sliding channels 54, 54' are supported on the main longitudinal beams 52, 52' respectively, via outboard track assemblies as described below.

An inboard expanding mechanism, the construction and operation of which is described in more detail below, includes inboard sliding channels 56, 56' to which are mounted component mounting pins 68, 68', respectively.

Inboard sliding channels 56, 56' are supported on the main longitudinal beams 52, 52', respectively, via inboard track assemblies as described below. Lateral angle beams 58, 60 are preferably provided between the inboard sliding channels 56, 56' and are fixed, as by welding, at opposite ends thereof to the inboard sliding channels 56, 56' and form a portion of the inboard expanding mechanism.

The expandable painting wagon of the present invention includes a support assembly actuating assembly for selectively actuating the inboard and outboard expanding mechanisms into a contracted or expanded position. The support assembly actuating assembly comprises a main lever 72 which is pivotally mounted at the center thereof to longitudinal beam 64 by a suitable pin fastener 80 (See FIG. 3). Main lever 72 preferably includes a straight middle portion 74 and rearwardly angled end portions 76, 78. Also, preferably provided on the main lever 72 are contact plate 79 extending below rearwardly angled portion 78 and contact plate 77 extending below rearwardly angled portion 76. (see FIG. 6) The contact plates 77, 79 may comprise a portion of channel material fixed to the main lever 72 as by welding.

A forward link 88 extends from main lever 72 to a portion of the inboard expanding mechanism, preferably, lateral angle beam 60. Forward link 88 is pivotally fixed to lateral angle beam 60 by suitable pin fastener 92 and is pivotally fixed to main lever 72 by suitable pin fastener 90. Similarly, rearward link 82 extends from main lever 72 to lateral angle beam 61 of the rearward inboard expanding mechanism.

The main lever 72 is constructed and arranged to be pivoted about pin fastener 80 upon having its opposite angled end portions 76, 78 alternately strike against rigid structures, such as post 94, which are fixed at the appropriate positions along the painting facility.

Outboard sliding channels 54, 54' of the outboard expanding mechanism and inboard sliding channels 56, 56' of the inboard expanding mechanism translate longitudinally on outboard and inboard track assemblies, respectively. The inboard and outboard track assemblies are secured on the inboard and outboard faces, respectively, of the longitudinal main beams 52, 52', at the forward and rearward ends thereof. Any suitable track assembly which permits longitudinal translation of the inboard and outboard expanding mechanisms while also supporting the inboard and outboard expanding mechanisms will suffice. The particular track assemblies described below and shown in the figures represents the presently preferred embodiment.

Figure 13:
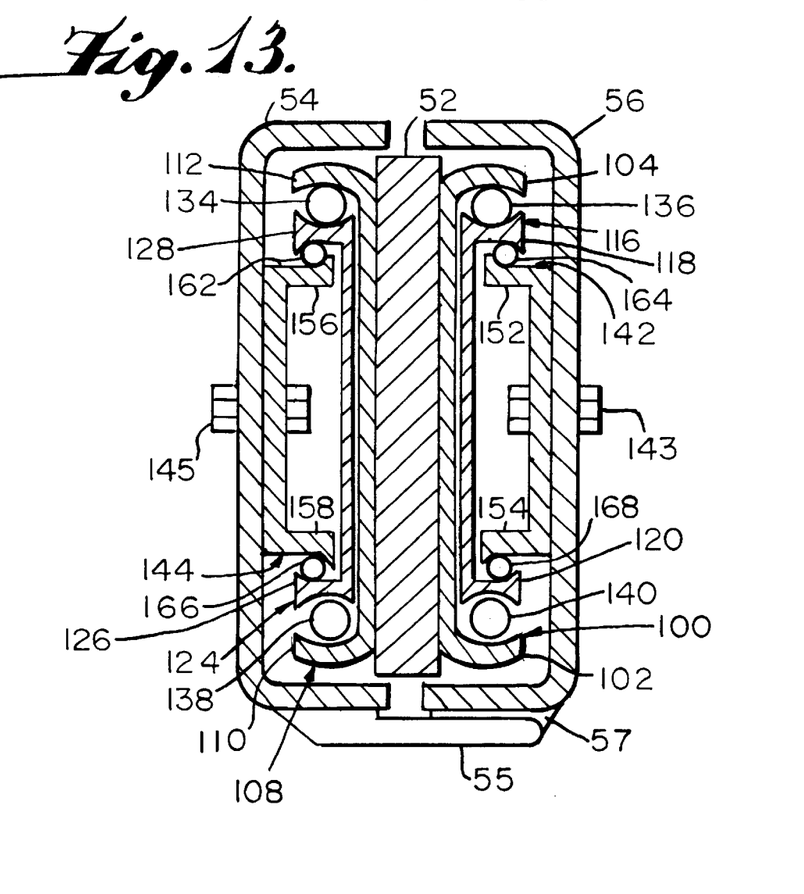
FIG. 13 is a cross section along the line XIII—XIII in FIG. 1 showing the details of an inboard and outboard track assembly.

Each of the inboard and outboard track assemblies of the preferred embodiment comprise left and right track assemblies mounted to the longitudinal main beams. Each track assembly preferably comprises a multiple channel structure, and, as shown in FIG. 13, the inboard track assembly to which the inboard sliding channel 56 is attached is a mirror image of the outboard track assembly to which outboard sliding channel 54 is attached. Both the inboard and outboard track assemblies are constructed and operate similarly to conventional three-piece drawer track assemblies.

Figure 7:
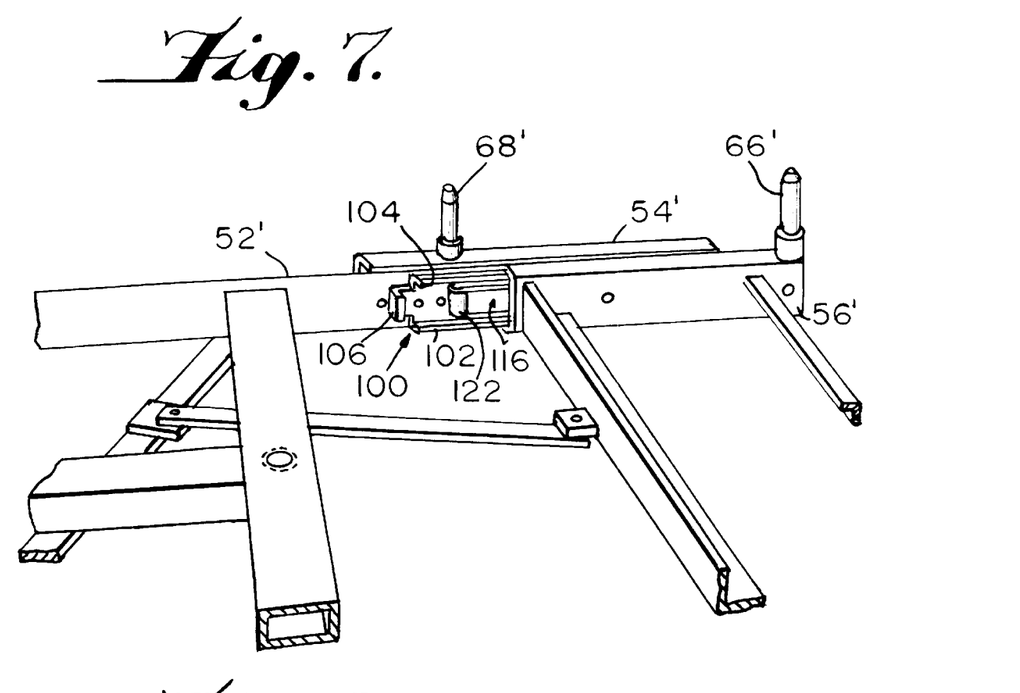
FIG. 7 is a breakout view of the component supporting assembly along the line VII—VII of FIG. 1, shown in an expanded configuration.
Figure 8:
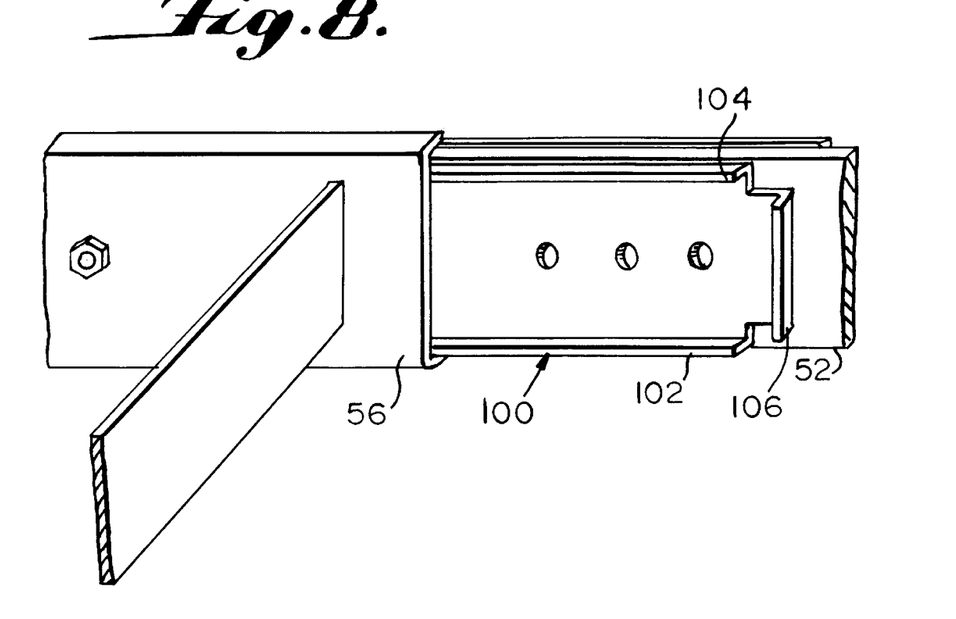
FIG. 8 is a breakaway prospective view showing an outer channel of an inboard track assembly of the inboard expanding mechanism.

As shown in FIGS. 7, 8 and 13, the inboard track assemblies include an outer channel 100 mounted to each of the longitudinal main beams 52, 52'. The outer channel 100 of the inboard track assembly includes a lower flange 102, an upper flange 104, and a stop flange 106.

Figure 10:
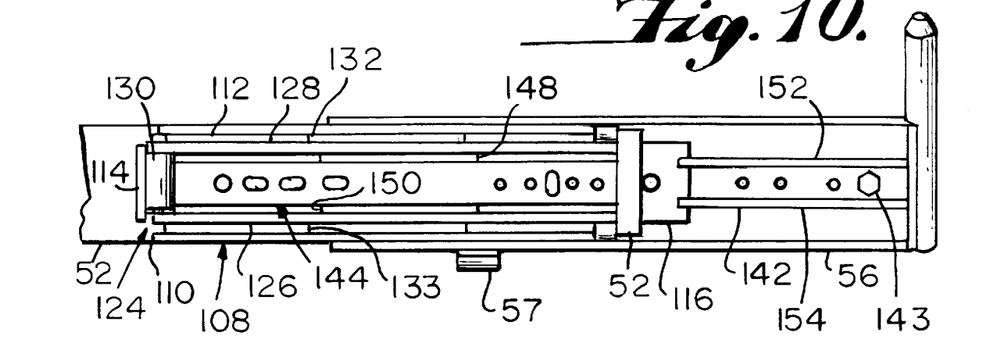
FIG. 10 is a partial side elevation showing an outboard track assembly in contracted configuration with the outboard sliding channel removed for clarity and a portion of an inboard track assembly in an expanded configuration.
Figure 11:
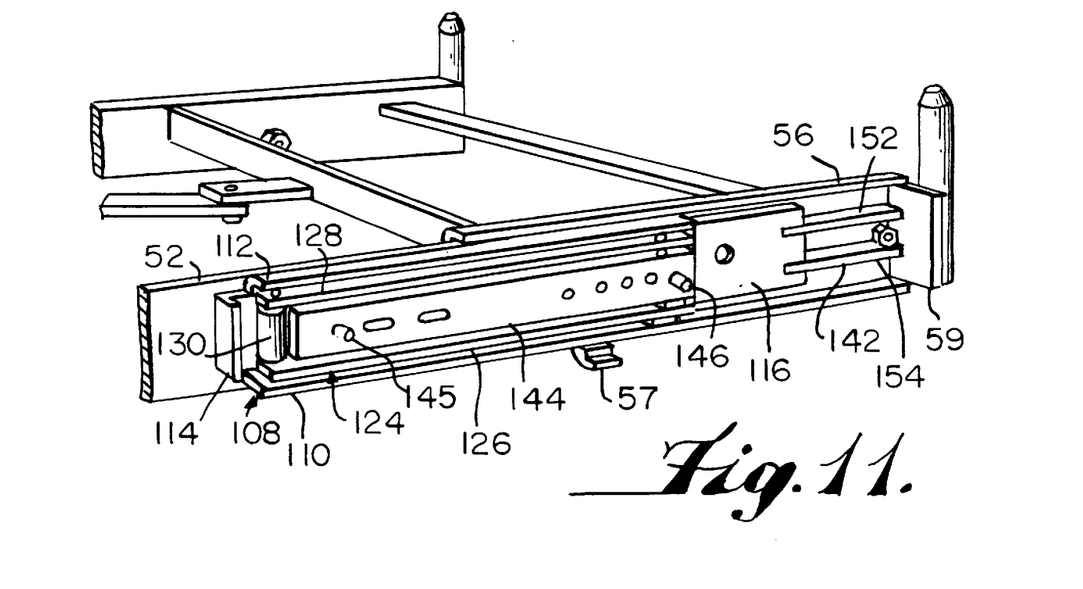
FIG. 11 is a partial prospective view showing an inboard track assembly in contracted configuration, with the outboard sliding channel removed for clarity, and a portion of an inboard track assembly in expanded configuration.
Figure 12:
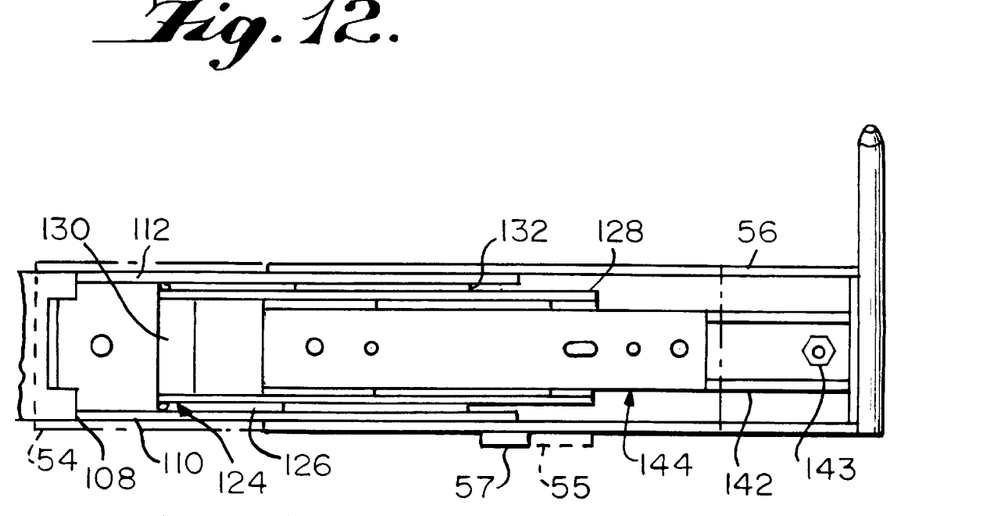
FIG. 12 is a partial side elevation showing an outboard track assembly in expanded configuration, with the outboard sliding channel removed for clarity, and a portion of an inboard track assembly in expanded configuration.

Similarly, as shown in FIGS. 10–13, the outboard track assemblies include outer channel 108 fixed to main longitudinal beams 50, 52'. In FIGS. 10 and 11, the outboard sliding channel 54 is removed for clarity, and the outboard track assembly is shown in an unextended, or contracted, configuration. In FIG. 12, outboard sliding channel 54 is shown in phantom, and the outboard track assembly is shown in an extended, or expanded, configuration. The outer channels 108 of the outer track assemblies include a lower flange 110, an upper flange 112, and a stop flange 114.

The inboard track assemblies include an intermediate channel 116, each of which is disposed so as to be longitudinally coextending within an associated outer channel 110. Intermediate channel 116 includes a lower flange 120 and an upper flange 118. Similarly, the outboard track assemblies include intermediate channels 124 disposed so as to be longitudinally coextending within associated outer channels 108. Intermediate channel 124 includes a lower flange 126 and an upper flange 128.

As shown in FIG. 10, with respect to an outboard track assembly, upper and lower ball bearing assemblies 132, 133 are disposed between intermediate channel 124 and outer channel 108. As shown in FIG. 13, the ball bearing assemblies house a plurality of ball bearings such as, for example, bearings 134 and 138 (or bearings 136 and 140 in the case of the inboard track assembly) disposed between upper flange 112 of outer channel 108 and upper flange 128 of intermediate channel 124 and between lower flange 110 of outer channel 108 and lower flange 126 of intermediate channel 124 so as to permit the intermediate channel 124 to rollably slide within outer channel 110.

As shown in FIG. 7, intermediate channel 116 of the inboard track assemblies includes resilient bumper 122, preferably comprised of rubber or other suitable elastomeric material. Bumper 122 engages stop flange 106 of outer channel 100 when the inboard sliding channel 56' is in the fully contracted configuration. Similarly, as shown in FIGS. 10–12, intermediate channel 124 of the outboard track assembly includes a bumper 130 also comprised of rubber or other suitable elastomeric material, which engages stop flange 114 of the outer channel 108 when the outboard sliding channel 54 (see FIG. 9) is in the fully contracted configuration.

As shown in FIGS. 9–13, the inboard track assembly further includes an inner channel 142 fixed to the outer sliding channels 56, 56' by fasteners 143 or the like. Each inner channel 142 is disposed so as to be longitudinally coextensive within an associated intermediate channel 116. Each inner channel 142 includes upper flange 152 and lower flange 154. Similarly, as shown in FIGS. 10–13, the outboard track assemblies include an inner channel 144 fixed to the outboard sliding channels 54, 54' by fasteners 145, 146. Inner channel 144 is disposed so as to be longitudinally coextensive within an associated intermediate channel 124. Each inner channel 144 includes an upper flange 156 and a lower flange 158.

As shown in FIG. 10, with respect to an outboard track assembly, the track assemblies include upper and lower ball bearing assemblies 148, 150 disposed between inner channel 144 and associated intermediate channel 124. Ball bearing assemblies 148, 150 house a plurality of ball bearings, such as ball bearing 162 and 166 shown in FIG. 13 (or ball bearings 164 and 168 in the case of the inboard track assembly) held between the upper flange 128 of the intermediate channel 124 and the upper flange 156 of the inner channel 144 and between the lower flange 126 of the intermediate channel 124 and the lower flange 158 of the inner channel 144 so as to permit the inner channel 144 of the outboard track assemblies to rollably translate within intermediate channel 124. Similarly, ball bearings, such as ball bearings 164 and 168 held between upper flange 118 of intermediate channel 116 and upper flange 152 of inner channel 142 and between lower flange 120 of intermediate channel 116 and lower flange 154 of inner channel 142 permit inner channel 142 of the inboard track assemblies to rollably translate within intermediate channels 116.

As shown in FIG. 10, inner channel 144 of the outboard track assemblies butts up against bumper 130 of intermediate channel 124 when the outboard sliding channels 54, 54' are in the fully contracted configuration. Similarly, inner channel 142 of the inboard track assemblies butts up against bumper 122 of intermediate channel 116 when the inboard sliding channels 56, 56' are in the fully contracted configuration.

The component supporting assembly shown in FIG. 3 is in a contracted configuration. Movement of the expandable painting wagon to the right, i.e., in the direction of arrow A, causes rearwardly angled portion 76 of main lever 72 to strike wagon-contracting post 94, thus causing main lever 76 to rotate in a clockwise direction as represented in FIG. 3. Clockwise rotation of main lever 72 causes forward translation of forward link 88 and rearward translation of rearward link 82. The forward translation of link 88 pushes on lateral beam 60 extending between and fixed to inboard sliding channels 56 and 56'. Inboard sliding channels 56, 56' are thus moved forwardly.

As inboard sliding channels 56, 56' are moved forwardly, inner channels 142 of the inboard track assemblies, to which inboard sliding channels 56, 56' are attached, rollably translate within intermediate channels 116. Inner stops (not shown) limit the longitudinal travel of the inner channel 142 within the intermediate channel 116. When the travel limit has been reached, intermediate channel 116 then rollably translates within outer channel 104. Due to friction within the system, intermediate channel 116 may begin longitudinal translation before inner channel 142 reaches its travel limit. Further inner stops (not shown) are provided to limit longitudinal travel of the intermediate channel within the outer channel.

Tabs 57, 57' are fixed to the bottom of the inboard sliding channels 56, 56', respectively. Tabs 57, 57' extend laterally so as to overlap the bottom portion of outboard sliding channels 54, 54', respectively. Similarly, tabs 55, 55' are fixed to the bottom of outboard sliding channels 54, 54'. Tabs 55, 55', extend laterally so as to overlap the bottom portion of inboard sliding channels 56, 56', respectively. When the expandable painting wagon is in the contracted configuration, tabs 55 and 57 are longitudinally spaced apart as shown in FIGS. 1 and 5. As the inboard expanding mechanism moves forwardly, tab 57 approaches tab 55 until tab 57 contacts tab 55. (FIGS. 4 and 12) With tab 57 in contact with tab 55, further forward movement of the inboard expanding mechanism causes the outboard expanding mechanism to be pushed forwardly. Accordingly, opposed mounting pins 66, 66', fixed to inboard sliding channels 56, 56', respectively, and opposed mounting pins 68, 68', fixed to outboard sliding channels 54, 54', respectively, are each expanded, or expanded, away from the center of the expandable painting wagon.

The expandable component supporting assembly is returned to the contracted position by a wagon-expanding post (not shown) which strikes rearwardly angled portion 78 of main lever 72, thus causing main lever 72 to rotate counter- clockwise in FIG. 3. Counterclockwise rotation of main lever 72 causes rearward translation of link 88 and forward translation of link 82, thus pulling the inboard sliding channels 56, 56' back toward the center of the expandable painting wagon and into the contracted configuration.

Figure 9:
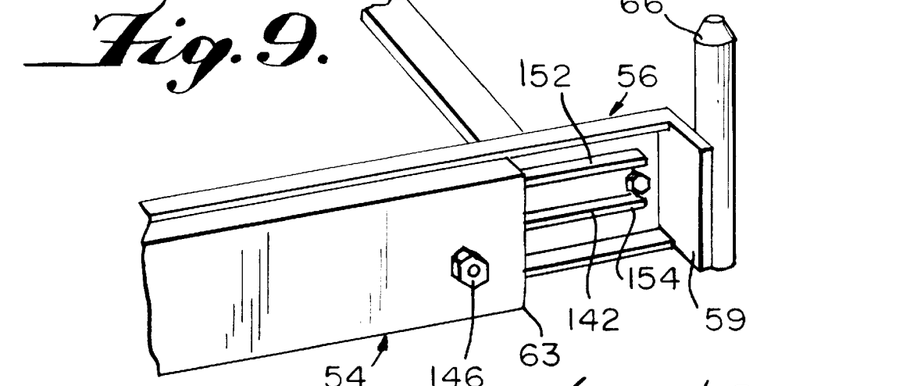
FIG. 9 is a partial prospective view showing details of an end plate and an inner channel of an inboard track assembly.

Inboard sliding channels 56, 56' include end plates 59 (see FIGS. 9 and 11). As inboard sliding channel 56 translates toward the center of the painting wagon, end plate 59 engages the end 63 of outboard sliding channel 54. As inboard sliding channel 56 continues to move toward the center of the wagon, outboard channel 54 is likewise pushed toward the center of the wagon by the engagement of end plate 59 with end 63 of outboard sliding channel 54.

Suitable first and second striking posts may be provided at the beginning and end, respectively, of the painting facility to contract the wagon as it enters the facility and expand the wagon as it exits the facility. Alternatively, first and second striking posts may be provided before and after, respectively, a turn in the wagon track to contract the wagon as it enters the turn to minimize the overall size of the wagon in the turn and expand the wagon after the turn.

A series of laterally opposed pairs of mounting pins 66, 66'; 68, 68'; and 70, 70' extending from the rearward end of the expandable component support assembly toward the center thereof. A corresponding series of laterally opposed pairs of mounting pins preferably extend from the forward end of the expandable component support assembly toward the center thereof. The expandable painting wagon of the present invention as illustrated in FIG. 1 is shown with five pairs of laterally opposed component mounting pins. The present invention is not, however, limited to five pairs of laterally opposed mounting pins but, on the contrary, may include more than five pairs or less than five pairs of laterally opposed mounting pins.

The expandable painting wagon of the present invention is shown and described as having inboard and outboard expanding mechanisms and associated mounting pins provided on both ends of the wagon. In the broadest aspect of the present invention, however, the expanding mechanisms and associated mounting pins could be provided on only one end of the wagon. In such a configuration, only one link extending from main lever 72 to the single inboard expanding mechanism is required. In addition, the expandable painting wagon of the present invention could include only a single (i.e., inboard or outboard) expanding mechanism.

Figures 2, 2A:
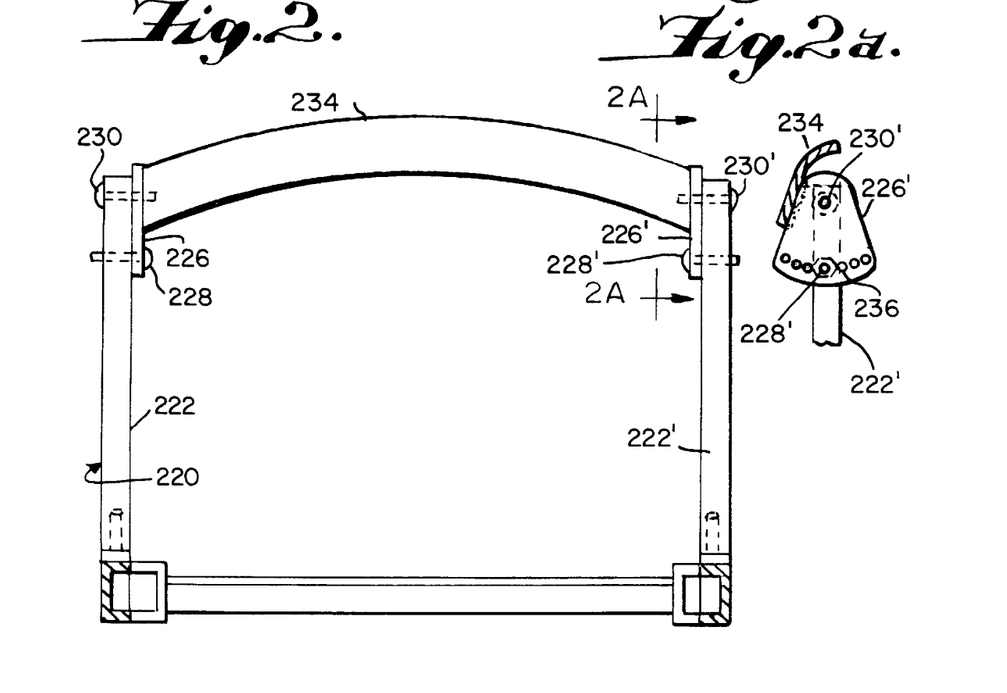
FIG. 2 is a plan view showing a component mounting apparatus for use with an expandable painting wagon according to the present invention.
FIG. 2A is a partial view of the component mounting apparatus viewed along the line 2A—2A in FIG. 2.

As shown in FIGS. 2 and 2A, a component mounting frame 220 adapted to be received by a pair of laterally opposed mounting pins is provided for mounting a particular component, such as a fascia, onto the expandable painting wagon. The component mounting frame 220, which is of conventional design, preferably includes a pair of laterally opposed vertical support posts 222, 222' and a laterally extending cross member 234 extending between the vertical posts 222, 222'. Lateral member 234 is preferably contoured laterally and longitudinally so as to conform to the inside of the component to be supported thereon.

Tilt plates 226, 226' are fixed, as by welding or the like, to opposite ends of the lateral member 234. Tilt plates 226, 226' are pivotally mounted at the upper ends thereof to the upper ends of the vertical posts 222, 222' by fasteners 230, 230'. At the arcuate end of the tilting plates 226, 226' a plurality of holes 236 are arranged at a constant radius from fasteners 230, 230'. The tilt angle of the component to be mounted on the mounting frame 220 can be adjusted by rotating lateral member 234 about fasteners 230, 230' and can be fixed by means of fasteners 228, 228' extending through one of the holes 236 into vertical post 222 and 222'.

Figure 4:
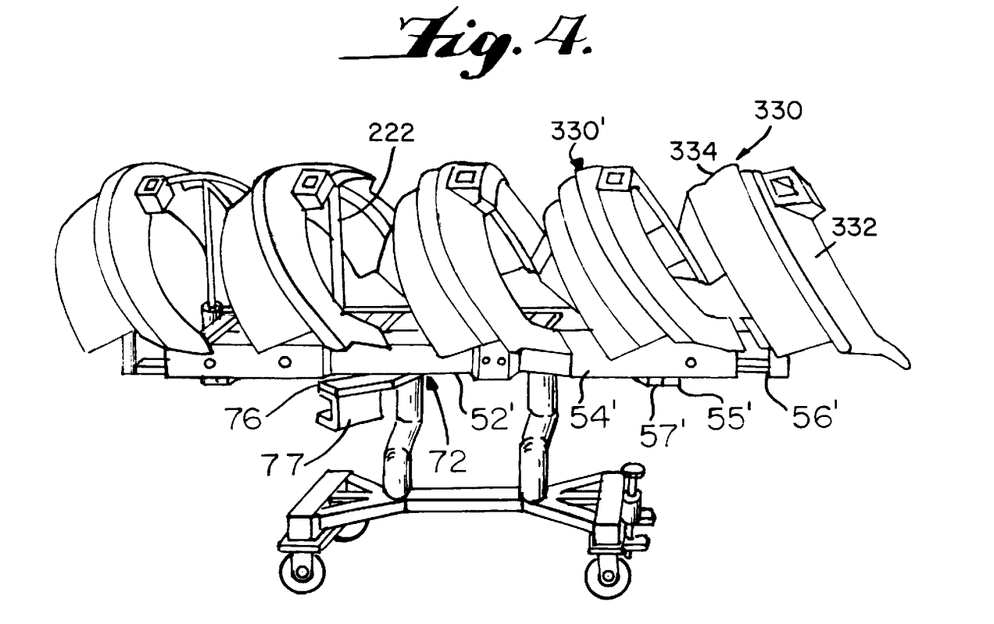
FIG. 4 is a perspective view of a painting wagon according to the present invention, shown in the expanded configuration and having a plurality of components mounted thereon.
Figure 5:
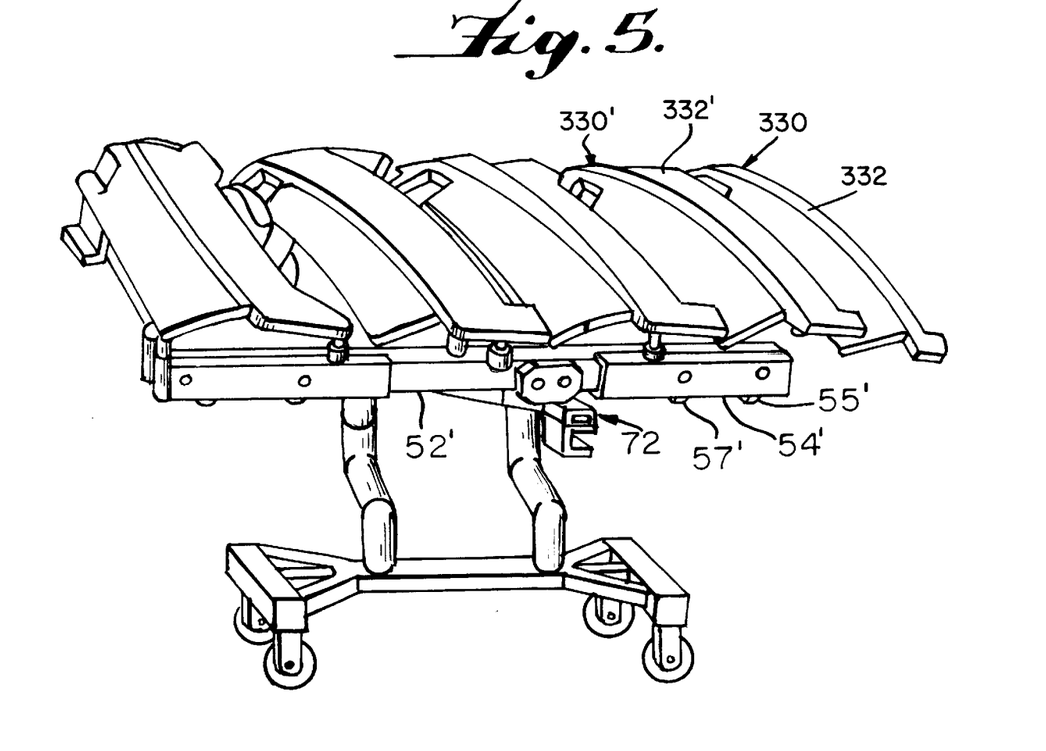
FIG. 5 is a perspective view of a painting wagon according to the present invention, shown in a contracted configuration and with a plurality of components mounted thereon.

An expandable painting wagon according to the present invention with five automobile fascias mounted thereon is shown in FIGS. 4 and 5. In FIG. 4, the expandable painting wagon is shown in the expanded configuration wherein the automobile fascias are secured at relatively spaced apart positions. In this configuration, the fascias 330, 330' can be on loaded and off loaded with minimal danger of surface damage from an adjacent fascia. The expandable painting wagon in FIG. 5 is shown in the contracted configuration wherein the fascias are disposed in closer proximity to one another, and whereas the overall length of the painting wagon is minimized. In the configuration shown in FIG. 5, each fascia, such as for example fascia 330, includes a portion 332 on which a colored strip is to be painted and a masked portion 334, which is masked with an appropriate masking material so that it is not painted. In the contracted configuration, the fascias are nested so that the portion 332' to be painted of one fascia 330' overlaps in a vertical direction the masked portion 334 of an adjacent fascia 330. By nesting the components, the overall size of the loaded wagon is minimized for the number of components mounted, while the surface to be painted is sufficiently exposed.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A painting wagon for carrying a plurality of components to be painted and translating said plurality of components through a painting facility, said painting wagon comprising:

a component supporting assembly having a plurality of component mounting structures each constructed and arranged to permit an associated one of said plurality of components to be mounted thereon, so that said components can be mounted in side by side relation to one another along a given direction, said component supporting assembly being constructed and arranged to be movable between: (1) an expanded configuration in which the component mounting structures are positioned in spaced apart relation with respect to one another along said given direction so that a number of components are mounted per unit length in said given direction; and (2) a contracted configuration in which said component mounting structures are positioned in closer proximity to one another relative to the spaced apart relation so that the number of components mounted per unit length in said given direction is greater than when the component supporting assembly is in the expanded configuration;

an actuating assembly operatively connected with said component supporting assembly and constructed and arranged to move the component supporting assembly between the contracted configuration and the expanded configuration, said actuating assembly including an actuating member constructed and arranged to activate said actuating assembly to move the component supporting assembly between the contracted and expanded configurations so that (1) the component supporting assembly can be positioned in the expanded configuration to facilitate mounting of the components on the component mounting structures, (2) said actuating member will activate said actuating assembly in response to engagement with a wagon-contracting structure to position the component supporting assembly in said contracted configuration while said painting wagon is translated through at least a portion of the painting facility, and (3) said actuating member will activate said actuating assembly in response to engagement with a wagon-expanding structure to position the component supporting assembly in said expanded configuration to facilitate dismounting of the components from the component mounting structures; and a base structure constructed and arranged to support the component supporting assembly and the actuating assembly and to permit translation of the painting wagon through the paint facility.

2. The painting wagon of claim 1, wherein said component supporting assembly further comprises:

first and second longitudinal main beams having corresponding first and second ends and disposed in substantially parallel orientation;

an inboard expanding mechanism having at least one of said plurality of component mounting structures removably attached thereto; and an inboard track assembly for movably connecting said inboard expanding mechanism to said first ends of said first and second longitudinal main beams;

wherein, when said component supporting assembly is moved into said expanded configuration, said inboard expanding mechanism is translated longitudinally along said inboard track assembly away from said second ends of said first and second longitudinal main beams, and wherein, when said component supporting assembly is moved into said contracted configuration, said inboard expanding mechanism is translated longitudinally along said inboard track assembly toward said second ends of said first and second longitudinal main beams.

3. The painting wagon of claim 2, wherein said component supporting assembly further comprises:

a second inboard expanding mechanism having one of said plurality of component mounting structures removably attached thereto; and a second inboard track assembly for movably attaching said second inboard expanding mechanism to said second ends of said first and second longitudinal main beams;

wherein, when said component supporting assembly is moved into said expanded configuration, said second inboard expanding mechanism is translated longitudinally along said second inboard track assembly away from said first ends of said first and second longitudinal main beams, and wherein, when said component supporting assembly is into said contracted configuration, said second inboard expanding mechanism is translated longitudinally along said second inboard track assembly toward said first ends of said first and second longitudinal main beams.

4. The painting wagon of claim 2, wherein said component supporting assembly further comprises:

an outboard expanding mechanism having a one of said plurality of component mounting structures removably attached thereto; and an outboard track assembly for movably attaching said outboard expanding mechanism to said first ends of said first and second longitudinal main beams, wherein, when said component supporting assembly is moved into said expanded configuration, translation of said inboard expanding mechanism along said inboard track assembly causes corresponding translation of said outboard expanding mechanism along said outboard track assembly away from said second ends of said first and second longitudinal main beams, and wherein, when said component supporting assembly is moved into said contracted configuration, translation of said inboard expanding mechanism along said inboard track assembly causes corresponding translation of said outboard expanding mechanism along said outboard track assembly toward said second ends of said first and second longitudinal main beams.

5. The painting wagon of claim 3, wherein said component supporting assembly further comprises:

a second outboard expanding mechanism having a one of said plurality of component mounting structures removably attached thereto; and a second outboard track assembly for movably attaching said second outboard expanding mechanism to said second ends of said first and second longitudinal main beams, wherein, when said component supporting assembly is moved into said expanded configuration, translation of said second inboard expanding mechanism along said second inboard track assembly causes corresponding translation of said second outboard expanding mechanism along said second outboard track assembly away from said first ends of said first and second longitudinal main beams, and wherein, when said component supporting assembly is moved into said contracted configuration, translation of said second inboard expanding mechanism along said second inboard track assembly causes corresponding translation of said second outboard expanding mechanism along said second outboard track assembly toward said first ends of said first and second longitudinal main beams.

6. The painting wagon of claim 2, wherein said actuating member comprises a main lever pivotally mounted on said component supporting assembly for movement between first and second directions; and wherein said actuating assembly includes a link extending between said main lever and said inboard expanding mechanism, said link being pivotally mounted at opposite ends thereof to said main lever and to said inboard expanding mechanism, one end of said main lever being constructed and arranged to engage a first rigid structure of the painting facility as said painting wagon is translated through said painting facility, wherein engagement of said one end with said first rigid structure as said wagon is translated by said first rigid structure causes said main lever to be pivoted in said first direction, said link being translated so as to pull said inboard expanding mechanism toward said second ends of said first and second longitudinal main beams when said main lever is pivoted in said first direction; and an opposite end of said main lever being constructed and arranged to engage a second rigid structure of the painting facility as said painting wagon is translated through the painting facility, wherein engagement of said opposite end with said second rigid structure as said wagon is translated causes said main lever to be pivoted in said second direction, said link being translated so as to push said inboard expanding mechanism away from said second ends of said first and second longitudinal main beams when said main lever is pivoted in said second direction.

7. The painting wagon of claim 3, wherein said actuating member comprises a main lever pivotally mounted to said component supporting assembly; and wherein said actuating assembly comprises:

a first link extending between said main lever and said inboard expanding mechanism, said link being pivotally mounted at opposite ends thereof to said main lever and to said inboard expanding mechanism; and a second link extending between said main lever and said second inboard expanding mechanism, said second link being pivotally mounted at opposite ends thereof to said main lever and to said second inboard expanding mechanism;

wherein, when said main lever is pivoted in a first direction, said first link is translated so as to pull said inboard expanding mechanism toward said second ends of said first and second longitudinal main beams and said second link is translated so as to pull said second inboard expanding mechanism toward said first ends of said first and second longitudinal main beams; and wherein, when said main lever is pivoted in a second direction, said first link is translated so as to push said inboard expanding mechanism away from said second ends of said first and second longitudinal main beams and said second link is translated so as to push said second inboard expanding mechanism away from said first ends of said first and second longitudinal main beams.

8. The painting wagon of claim 1, wherein said actuating member comprises a main lever operably coupled to said component supporting assembly and movable between a first position and a second position, said main lever being constructed and arranged to move said component supporting assembly into said contracted configuration when said main lever is moved into said first position, and to move said component supporting assembly into said expanded configuration when said main lever is moved into said second position.

9. The painting wagon of claim 8, wherein said main lever is pivotally mounted for movement on said component supporting assembly and comprises:

one end constructed and arranged to cooperate with at least one associated wagon-expanding post located in the painting facility as the painting wagon is translated through the painting facility to cause said main lever to be moved into said first position; and an opposite end constructed and arranged to cooperate with at least one associated wagon-contracting post located in the painting facility as the painting wagon is translated through the painting facility to cause said main lever to move into said second position.

10. The painting wagon of claim 1 constructed and arranged to be translated along a track through said painting facility, said track having straight and arcuate portions, said component supporting assembly being constructed and arranged to be moved into said expanded configuration when said wagon is translated along said straight portions of said track and to be moved into said contracted configuration when said wagon is translated through said arcuate portions.

11. A painting wagon for carrying a plurality of components to be painted and translating said plurality of components through a painting facility, said painting wagon comprising:

a component supporting assembly having a plurality of component mounting structures each constructed and arranged to permit an associated one of said plurality of components to be mounted thereon, so that said components can be mounted in side by side relation to one another along a given direction, said component supporting assembly being constructed and arranged to be movable between: (1) an expanded configuration in which the component mounting structures are positioned in spaced apart relation with respect to one another along said given direction so that a number of components are mounted per unit length in said given direction; and (2) a contracted configuration in which said component mounting structures are positioned in closer proximity to one another relative to the spaced apart relation so that at least one of the components mounted thereon has a portion thereof disposed in overlying relation with respect to an adjacent one of said components and so that the number of components mounted per unit length in said given direction is greater than when the component supporting assembly is in the expanded configuration;

an actuating assembly operatively connected with said component supporting assembly and constructed and arranged to move the component supporting assembly between the contracted configuration and the expanded configuration, so that the component supporting assembly is 1) positioned in the expanded configuration to facilitate mounting of the components on the component mounting structures, 2) positioned in said contracted configuration while said painting wagon is translated through at least a portion of the painting facility, and 3) positioned in said expanded configuration to facilitate dismounting of the components from the component mounting structures, said actuating assembly being constructed and arranged to alternatingly strike rigid structures at positions along the painting facility to effect said movement of said component supporting assembly; and a base structure constructed and arranged to support the component supporting assembly and the actuating assembly and to permit translation of the painting wagon through the paint facility.

12. A painting wagon for carrying a plurality of components to be painted and translating said plurality of components through a painting facility, said painting wagon comprising:

a component supporting assembly having a plurality of component mounting structures each constructed and arranged to permit an associated one of said plurality of components to be mounted thereon, so that said components can be mounted in side by side relation to one another along a given direction, said component supporting assembly being constructed and arranged to be movable between: (1) an expanded configuration in which the component mounting structures are positioned in spaced apart relation with respect to one another along said given direction so that a number of components are mounted per unit length in said given direction; and (2) a contracted configuration in which said component mounting structures are positioned in closer proximity to one another relative to the spaced apart relation so that at least one of the components mounted thereon has a portion thereof disposed in overlying relation with respect to an adjacent one of said components and so that the number of components mounted per unit length in said given direction is greater than when the component supporting assembly is in the expanded configuration;

an actuating assembly operatively connected with said component supporting assembly and constructed and arranged to move the component supporting assembly between the contracted configuration and the expanded configuration, so that the component supporting assembly is 1) positioned in the expanded configuration to facilitate mounting of the components on the component mounting structures, 2) positioned in said contracted configuration while said painting wagon is translated through at least a portion of the painting facility, and 3) positioned in said expanded configuration to facilitate dismounting of the components from the component mounting structures, said actuating assembly including a main lever pivotally mounted to said component supporting assembly for movement between a first position and a second position and including one end constructed and arranged to cooperate with at least one associated wagon-expanding post located in the painting facility as the painting wagon is translated through the painting facility to cause said main lever to be moved into said first position and an opposite end constructed and arranged to cooperate with at least one associated wagon-contracting post located in the painting facility as the painting wagon is translated through the painting facility to cause said main lever to move into said second position, said main lever being constructed and arranged to move said component supporting assembly into said contracted configuration when said main lever is moved into said first position, and to move said component supporting assembly into said expanded configuration when said main lever is moved into said second position; and a base structure constructed and arranged to support the component supporting assembly and the actuating assembly and to permit translation of the painting wagon through the paint facility.

* * * * *